United States Patent
Abatzoglou

(12) 
(10) Patent No.: US 6,603,424 B1
(45) Date of Patent: Aug. 5, 2003

(54) SYSTEM, METHOD AND COMPUTER PROGRAM PRODUCT FOR REDUCING ERRORS IN SYNTHETIC APERTURE RADAR SIGNALS

(75) Inventor: Theagenis J. Abatzoglou, Huntington Beach, CA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 10/209,093

(22) Filed: Jul. 31, 2002

(51) Int. Cl.$^7$ .............................................. G01S 13/00
(52) U.S. Cl. ....................... 342/25; 342/159; 342/195
(58) Field of Search .......................... 342/25, 159, 195, 342/196

(56) References Cited

U.S. PATENT DOCUMENTS

| | | | | |
|---|---|---|---|---|
| 4,034,370 A | * | 7/1977 | Mims | 342/25 |
| 4,771,287 A | | 9/1988 | Mims | |
| 4,924,229 A | * | 5/1990 | Eichel et al. | 342/25 |
| 4,999,635 A | | 3/1991 | Niho | |
| 5,012,249 A | | 4/1991 | Chan | |
| 5,248,976 A | * | 9/1993 | Niho et al. | 342/25 |
| 5,250,952 A | | 10/1993 | Roth | |
| 5,343,204 A | * | 8/1994 | Farmer et al. | 342/25 |
| 5,424,743 A | * | 6/1995 | Ghiglia et al. | 342/25 |
| 5,708,436 A | * | 1/1998 | Loiz et al. | 342/25 |
| 5,744,710 A | | 4/1998 | Abatzoglou et al. | |
| 5,748,507 A | | 5/1998 | Abatzoglou et al. | |
| 5,774,089 A | * | 6/1998 | Bamler et al. | 342/25 |
| 6,037,892 A | * | 3/2000 | Nikias et al. | 342/25 |
| 6,155,704 A | * | 12/2000 | Hunt et al. | 342/25 |
| 6,255,981 B1 | * | 7/2001 | Samaniego | 342/25 |

OTHER PUBLICATIONS

Steve Plimpton, Gary Mastin, Dennis Ghiglia; *Synthetic Aperture Radar Image Processing on Parallel Supercomputers*; 7 pages; Sandia National Laboratories; Albuquerque, New Mexico; available in Proc of Supercomputing '91, Albuquerque, New Mexico, Nov. 1991, pp. 446–452.

* cited by examiner

Primary Examiner—Thomas H. Tarcza
Assistant Examiner—Brian K Andrea
(74) Attorney, Agent, or Firm—Alston & Bird LLP

(57) ABSTRACT

A system is provided for reducing errors in synthetic aperture radar signals from a plurality of range lines where each range line includes a plurality of azimuth positions. The system comprises an autofocus processor for receiving a plurality of slow-time samples. The autofocus processor can estimate a phase error for each slow-time sample by a maximum likelihood technique and thereafter compensate the plurality of slow-time samples by the estimated phase errors to obtain a plurality of range-line samples. The implementation of the maximum likelihood technique is done by a superresolution technique along slow-time samples which also estimates a plurality of Doppler frequencies and amplitudes for a plurality of point scatterers at each range line. Further, the autofocus processor can also predict the performance of the autofocus technique by computing a resulting root mean square error of the estimated phase error which is derived form the corresponding Cramer Rao bound.

39 Claims, 7 Drawing Sheets

SYSTEM, METHOD AND COMPUTER PROGRAM PRODUCT FOR REDUCING ERRORS IN SYNTHETIC APERTURE RADAR SIGNALS

FEDERALLY SPONSORED RESEARCH OR DEVELOPMENT

This invention was made with government support under F33657-00-5219 awarded by the Department of the Air Force. The government may have certain rights in this invention.

FIELD OF THE INVENTION

The present invention relates generally to systems and methods of processing synthetic aperture radar signals and, more particularly, relates to systems and methods of autofocusing synthetic aperture radar signals utilizing superresolution processing.

BACKGROUND OF THE INVENTION

There has been a continuing effort to develop radar systems which are suitable for high-resolution applications, such as ground-mapping and air reconnaissance. Initially, this finer resolution was achieved by the application of pulse-compression techniques to conventional radar systems which were designed to achieve range resolution by the radiation of a short pulse, and angular, or azimuth, resolution by the radiation of a narrow beam. The pulse-compression techniques provided significant improvement in the range resolution of the conventional radar systems, but fine angular resolution by the radiation of a narrow beam still required a large-diameter antenna which was impractical to transport with any significant degree of mobility. Subsequent to the development of pulse-compression techniques, synthetic aperture radar (SAR) techniques were developed for improving the angular resolution of a radar system to a value significantly finer than that directly achievable with a radiated beam width from a conventional antenna of comparable diameter.

In prior techniques, an equivalent to a large-diameter antenna was established which was comprised of a physically long array of antennas, each having a relatively small diameter. In the case of a long antenna array, a number of radiating elements were positioned at sampling points along a straight line and transmission signals were simultaneously fed to each element of the array. The elements were interconnected such that simultaneously received signals were vectorially added to exploit the interference between the signals received by the various elements to provide an effective radiation pattern which was equivalent to the radiation pattern of a single element multiplied by an array factor. That is, the product of a single element radiation pattern and the array factor resulted in an effective antenna pattern having significantly sharper antenna pattern lobes than the antenna pattern of the single element.

SAR systems are based upon the synthesis of an effectively long antenna array by signal processing means rather than by the use of a physically long antenna array. With an SAR, it is possible to generate a synthetic antenna many times longer than any physically large antenna that could be conveniently transported. As a result, for an antenna of given physical dimensions, the SAR will have an effective antenna beam width that is many times narrower than the beam width which is attainable with a conventional radar. In most SAR applications, a single radiating element is translated along a trajectory, to take up sequential sampling positions. At each of these sampling points, a signal is transmitted and the amplitude and the phase of the radar signals received in response to that transmission are stored. After the radiating element has traversed a distance substantially equivalent to the length of the synthetic array, the signals in storage are somewhat similar to the signals that would have been received by the elements of an actual linear array antenna.

A SAR can obtain a resolution similar to a conventional linear array of equivalent length as a consequence of the coherent transmission from the sampling points of the SAR. The stored SAR signals are subjected to an operation which corresponds to that used in forming the effective antenna pattern of a physical linear array. That is, the signals are added vectorially, so that the resulting output of the SAR is substantially the same as could be achieved with the use of a physically long, linear antenna array.

In generating the synthetic antenna, the signal processing equipment of an SAR operates on a basic assumption that the radar platform travels along a straight line trajectory at a constant speed. In practice, an aircraft carrying the radar antenna is subject to deviations from such non-accelerated flight. It is therefore necessary to provide compensation for these perturbations to straight-line motion. This motion compensation must be capable of detecting the deviation of the radar platform path from a true linear path.

Briefly, and referring now to FIG. 1 in the drawings, an SAR system carried by an aircraft 10 maps a target region 12 by transmitting and receiving radar signals at various sampling points $S_1, \ldots S_N$, along the flight path 14 of the aircraft. In this regard, the SAR system may be positioned in the nose portion 15 of the aircraft. As the SAR system operates, errors can be introduced into the system that, if not compensated for, will corrupt the signal phase, possibly to the extent that the resulting degraded image is of no practical use. Such errors can be introduced from a variety of sources, including errors in motion measurements, inaccurate acceleration estimates and atmospheric/ionospheric propagation effects. Such errors can be rather arbitrary and perhaps describable by a wide-band random process. A typical requirement of a SAR system is the phase errors must be corrected with an accuracy of about 10 degrees root mean square error (RMSE) or better (e.g., 7 degrees) so that the quality of the resulting SAR image is not compromised. Thus, a need exists to process the received radar signals to compensate for such errors to achieve the highest quality SAR image. Conventional processing techniques, however, typically suffer from lack of accuracy in situations where target/clutter-to-noise ratios are low or there are several competing scatterers in a given range cell. Such drawbacks are typical, for example, in techniques based on phase (pulse-pair product) comparisons.

SUMMARY OF THE INVENTION

In light of the foregoing background, the present invention provides an improved system, method and computer program product for reducing errors in synthetic aperture radar (SAR) signals. The system, method and computer program product of embodiments of the present invention implement maximum likelihood estimation for autofocusing SAR signals to reduce errors in SAR signals, particularly at low signal/clutter-to-noise ratios and in situations where multiple scatterers are present in the same range line. Advantageously, the system, method and computer program product use superresolution processing along the slow-time, or azimuth, positions to separate closely spaced scatterers on the same range lines and estimate the signal plus clutter components with higher fidelity.

According to one aspect of the present invention, a system is provided for reducing errors in synthetic aperture radar signals from a plurality of range lines where each range line includes a plurality of azimuth positions. The system comprises an autofocus processor capable of receiving a plurality of slow-time samples representing radar signals for a plurality of azimuth positions for a plurality of range lines. The autofocus processor is also capable of estimating a phase error for each slow-time sample and thereafter compensating the plurality of slow-time samples by the estimated phase errors to obtain a plurality of range-line samples. For example, the autofocus processor can compensate the plurality of slow-time samples based upon a diagonal random phasor matrix. More particularly, the autofocus processor can compensate the plurality of slow-time samples by multiplying the slow-time samples $\vec{x}_m$ by a complex conjugate of the diagonal random phasor matrix to obtain a plurality of range-line samples, $\vec{y}_m$. In this regard, $\vec{x}_m$ represents a plurality of slow-time samples for each range line m, and $\vec{y}_m$ represents a plurality of range-line samples for each range line.

With the range-line samples, the autofocus processor is capable of processing the range-line samples according to a superresolution signal processing technique to thereby obtain a plurality of Doppler frequencies for a plurality of point scatterers at each range line. In this regard, the autofocus processor can process the range-line samples according to a superresolution signal processing technique including Constrained Total Least Squares parameter estimation. With the Doppler frequencies, then, the autofocus processor can reconstruct a true signal for each range line based upon the plurality of Doppler frequencies and thereafter obtain a correction to the estimated phase error for each slow-time sample based upon the range-line samples and the true signals.

The autofocus processor can be capable of reconstructing a true signal based upon a plurality of Doppler frequency steering matrices, $\hat{E}_m$. In this regard, the plurality of Doppler frequency steering matrices can be represented as follows:

$$\hat{E}_m = E(\hat{f}_{1,m}, \ldots, \hat{f}_{K,m}),$$

where $\hat{f}_{k,m}$ represents the Doppler frequency for each of K point scatterers at each range line m. The autofocus processor can then reconstruct a true signal $\hat{s}_m$ for each range line according to the following:

$$\hat{s}_m = \hat{E}_m \hat{z}_m,$$

where $\hat{z}_m$ represents a plurality of complex amplitudes of the scatterers at each range line. Further, the autofocus processor can be capable of determining the plurality of complex amplitudes of the scatterers at each range line according to the following:

$$\hat{z}_m = (\hat{E}_m{}^* \hat{E}_m)^- \hat{E}_m{}^* \vec{y}_m.$$

More particularly, then, the autofocus processor can be capable of obtaining a correction $\delta\hat{\phi}_n$ to the estimated phase error for each slow-time sample according to the following:

$$\delta\hat{\phi}_n = \arg\left\{\sum_m y_{n,m} \bar{s}_{n,m}\right\}.$$

In obtaining the correction, n=−N, . . . 0, . . . N represents each of 2N+1 slow-time samples at each range line.

To further reduce errors in the radar signals, the autofocus processor can also be capable of replacing the slow-time samples with the range-line samples when a difference between the estimated phase error for each slow-time sample and a respective correction is greater than a predetermined threshold. Then, the autofocus processor can compensate the slow-time samples, process the range-line samples, reconstruct the true signal, obtain the correction, and replace the slow-time samples until a root mean square error (RMSE) of the estimated phase correction for each slow-time is less than the predetermined threshold, typically after a number of iterations of the method.

According to another aspect of the present invention, a system is provided for determining an accuracy of estimated phase errors in synthetic aperture radar signals, where the signals are from a plurality of range lines that each includes a plurality of azimuth positions. The system includes a processing element capable of calculating true signals for a plurality of slow-time samples for the plurality of range lines. The processing element can be capable of selecting a plurality of signal scatterer parameters. In such an instance, processing element can calculate the true signals based upon the point scatterer parameters. Alternatively, the processing element can calculate the true signals by first receiving the plurality of slow-time samples and thereafter estimating a phase error for each slow-time sample. Then, the processing element can compensate the plurality of slow-time samples by the estimated phase errors to obtain a plurality of range-line samples. The processing element next processes the range-line samples according to a superresolution signal processing technique to thereby obtain a plurality of Doppler frequencies for a plurality of point scatterers at each range line. And then the processing element reconstructs a true signal for each range line based upon the plurality of Doppler frequencies.

In addition to calculating the true signals, the processing element is also capable of determining a true signal power for each slow-time sample summed over the plurality of range lines and a total true signal power, where the true signal powers are based upon the true signals and the total true signal power is based upon amplitudes of the scatterers. Additionally, the processing element can determine a Cramer Rao Bound (CRB) based upon a clutter-plus-receiver noise power, the true signal powers, a dominant scatterer power, the number of slow time samples and the total true signal power. In this regard, processing element can also be capable of estimating the clutter-plus-receiver noise power upon a uniform clutter noise and a receiver noise model. Based upon the CRB, then, the processing element can determine a root mean square error. A method and computer program product for reducing errors, and a method and computer program product for determining an accuracy of estimated phase errors are also provided.

BRIEF DESCRIPTION OF THE DRAWINGS

Figure 1:
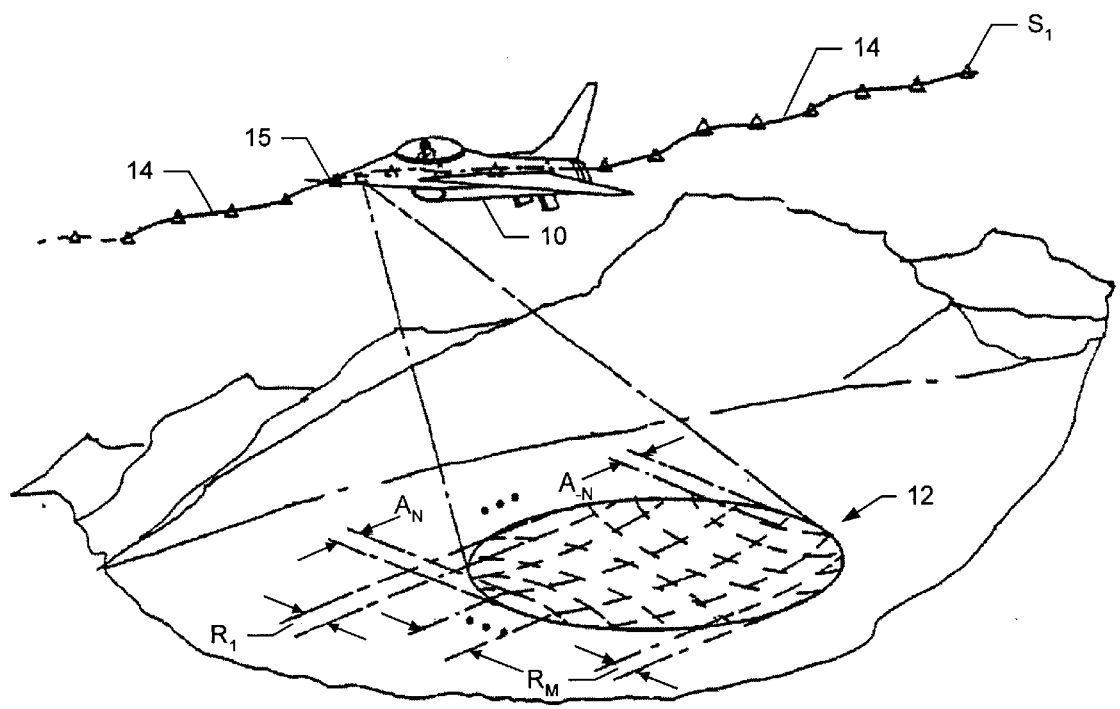
Figure 2:
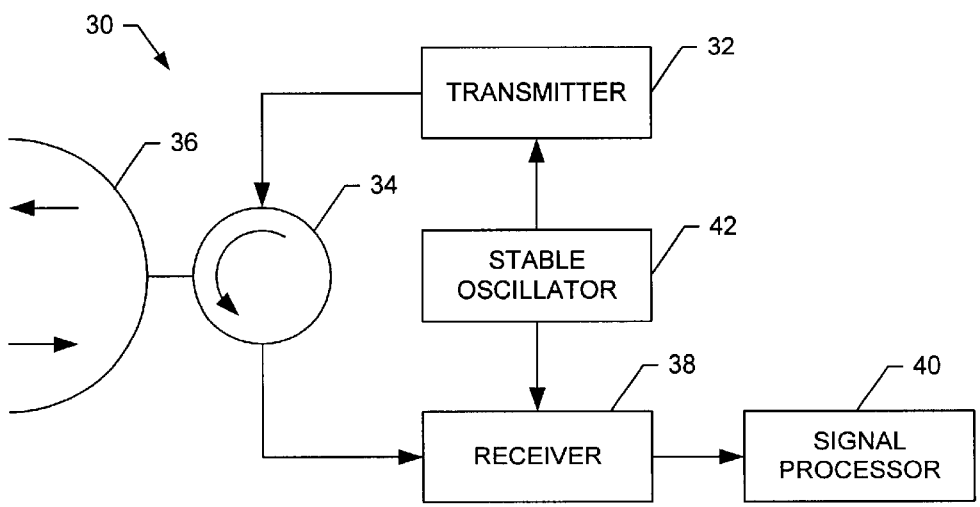
Figure 3:
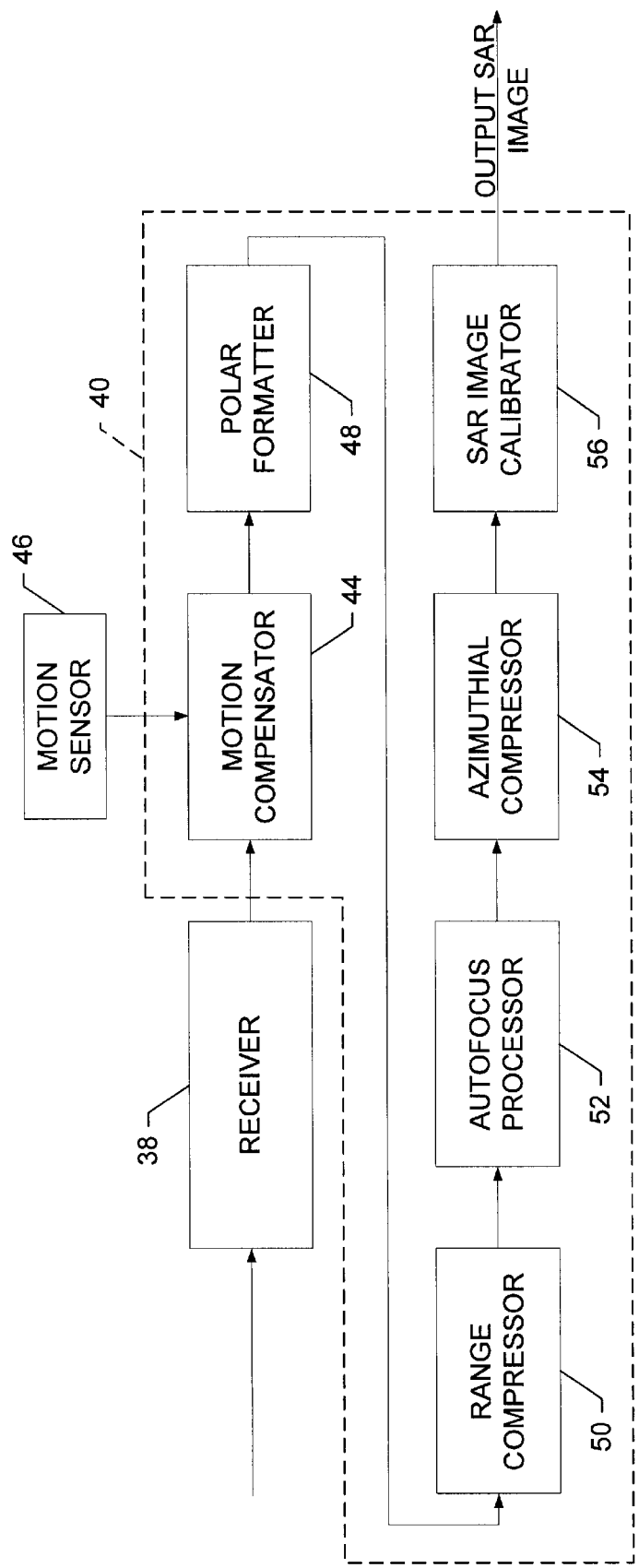
Figure 4:
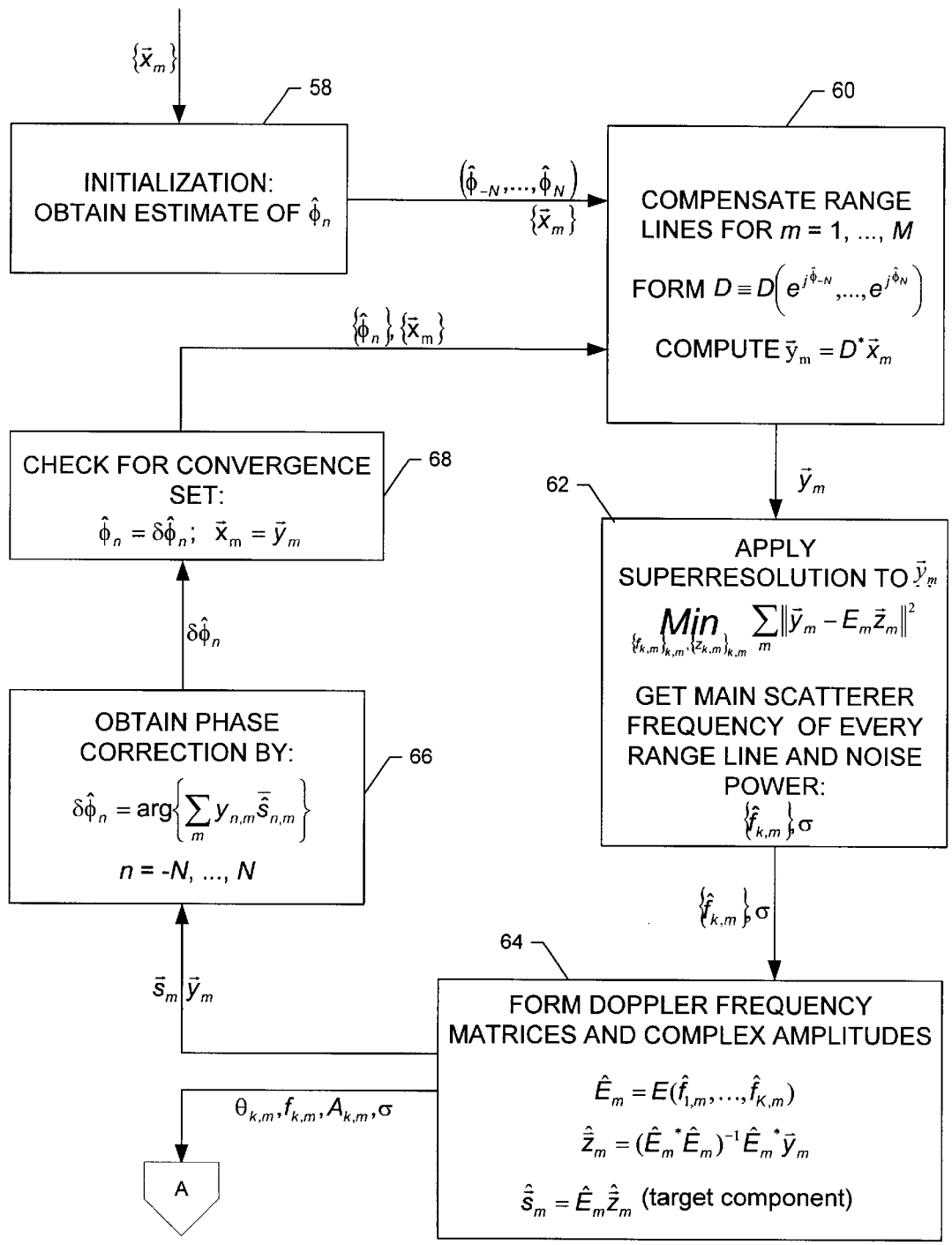
Figure 5:
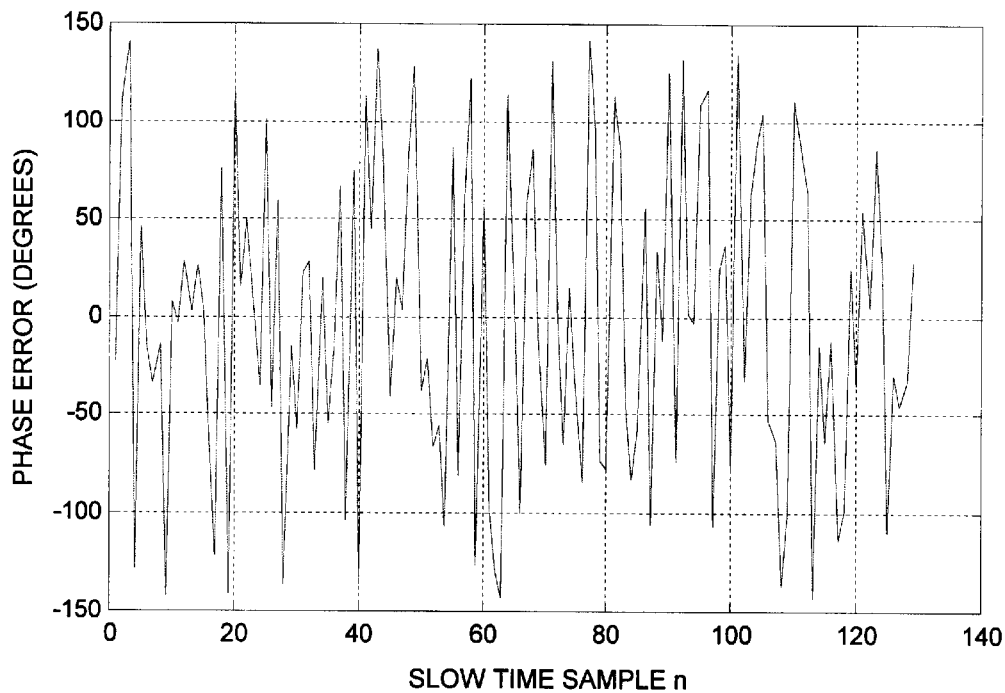
Figure 6:
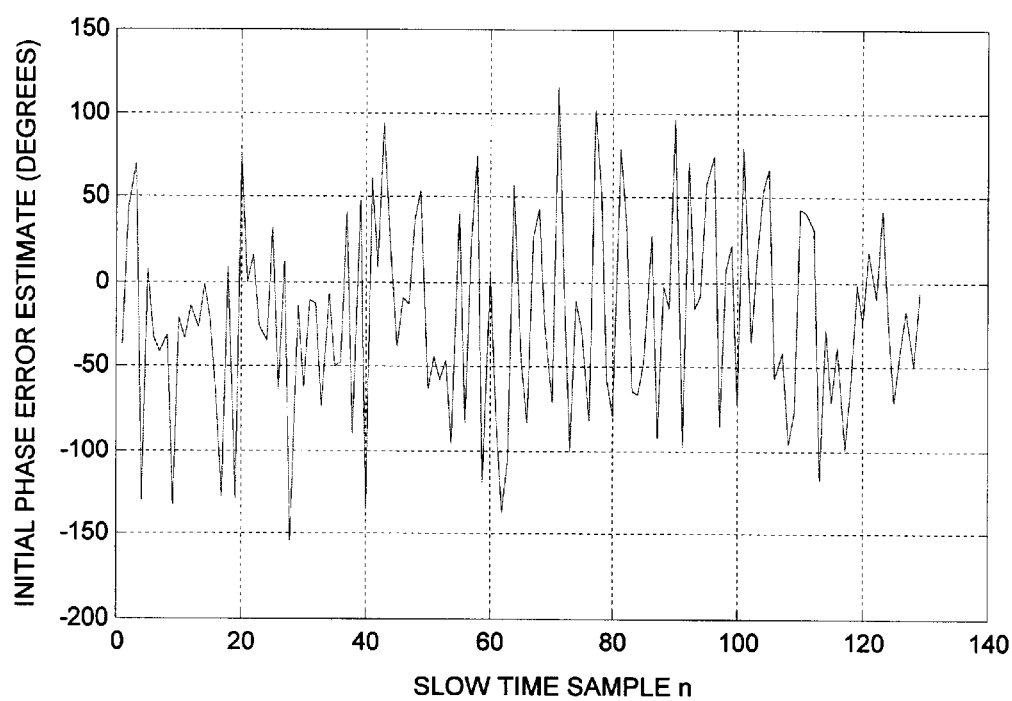
Figure 7:
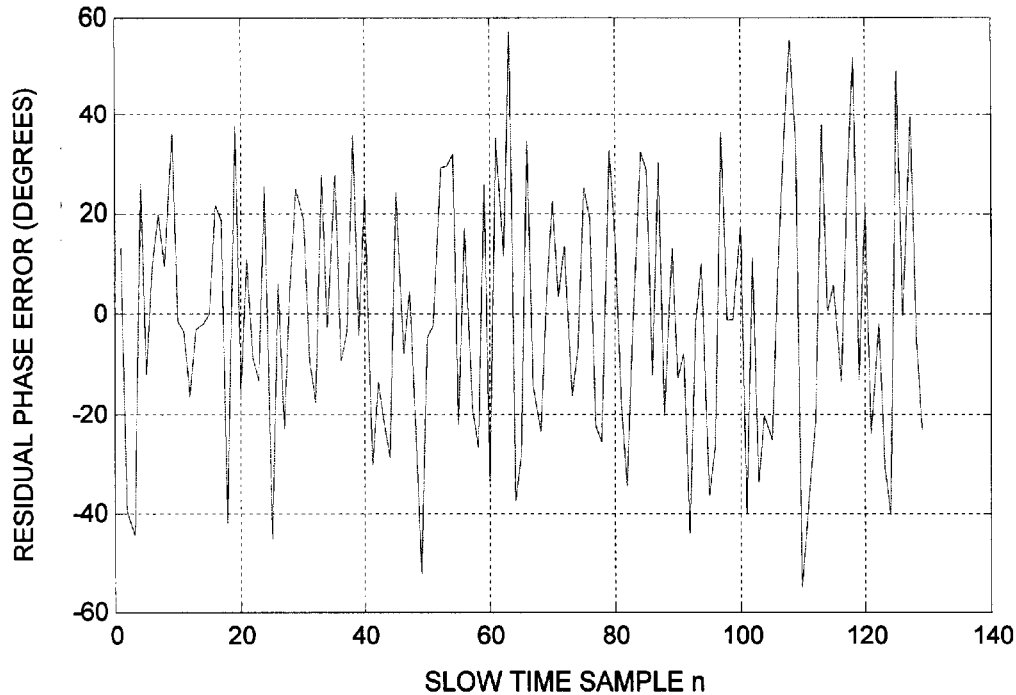
Figure 8:
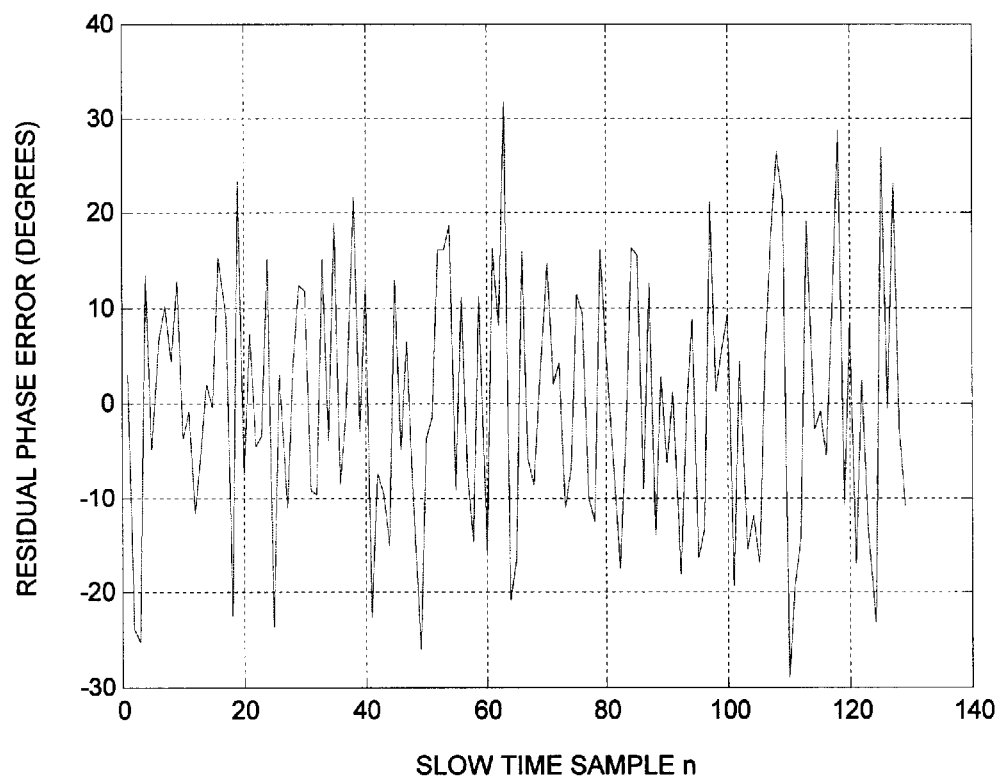
Figure 9:
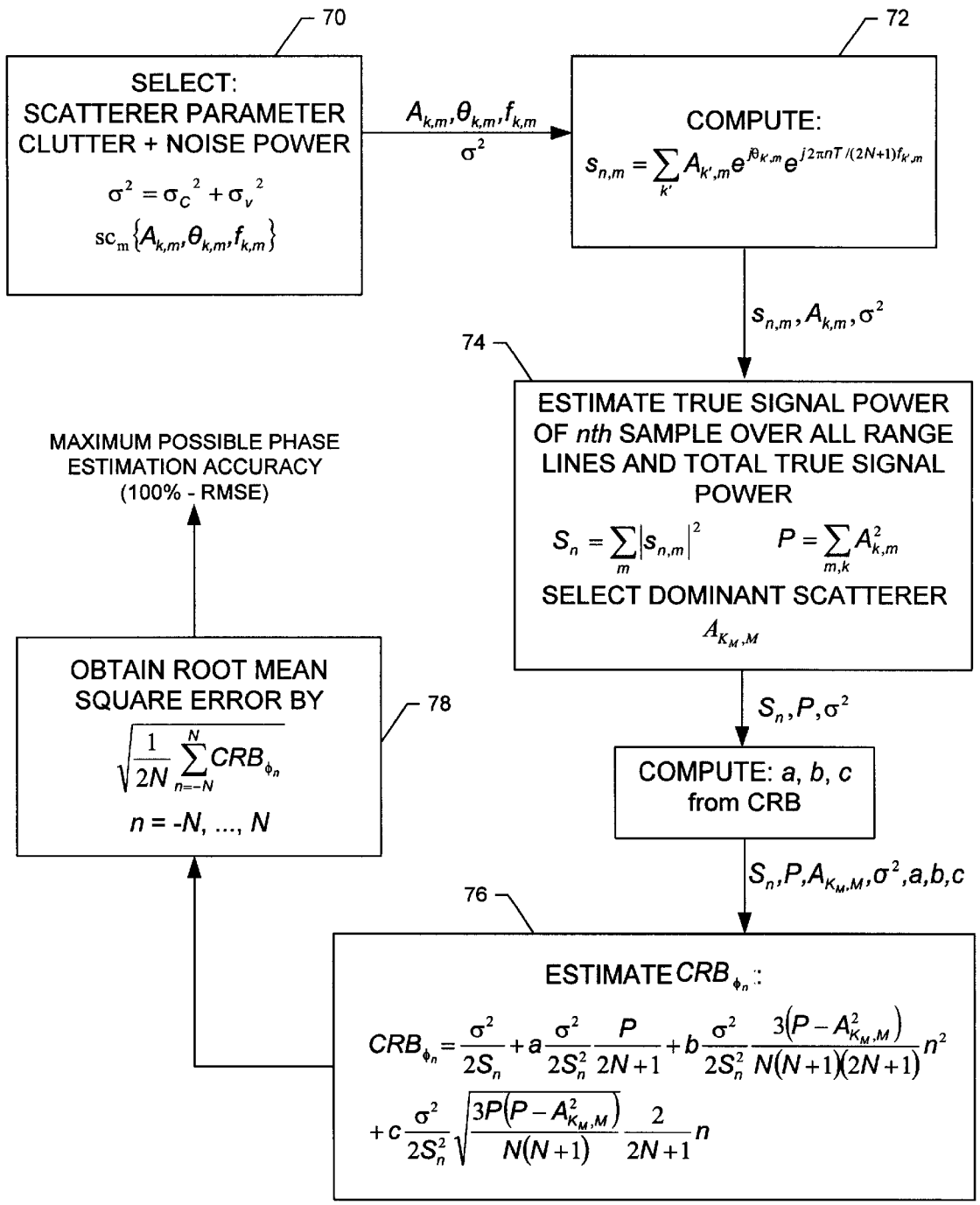
Figure 10:
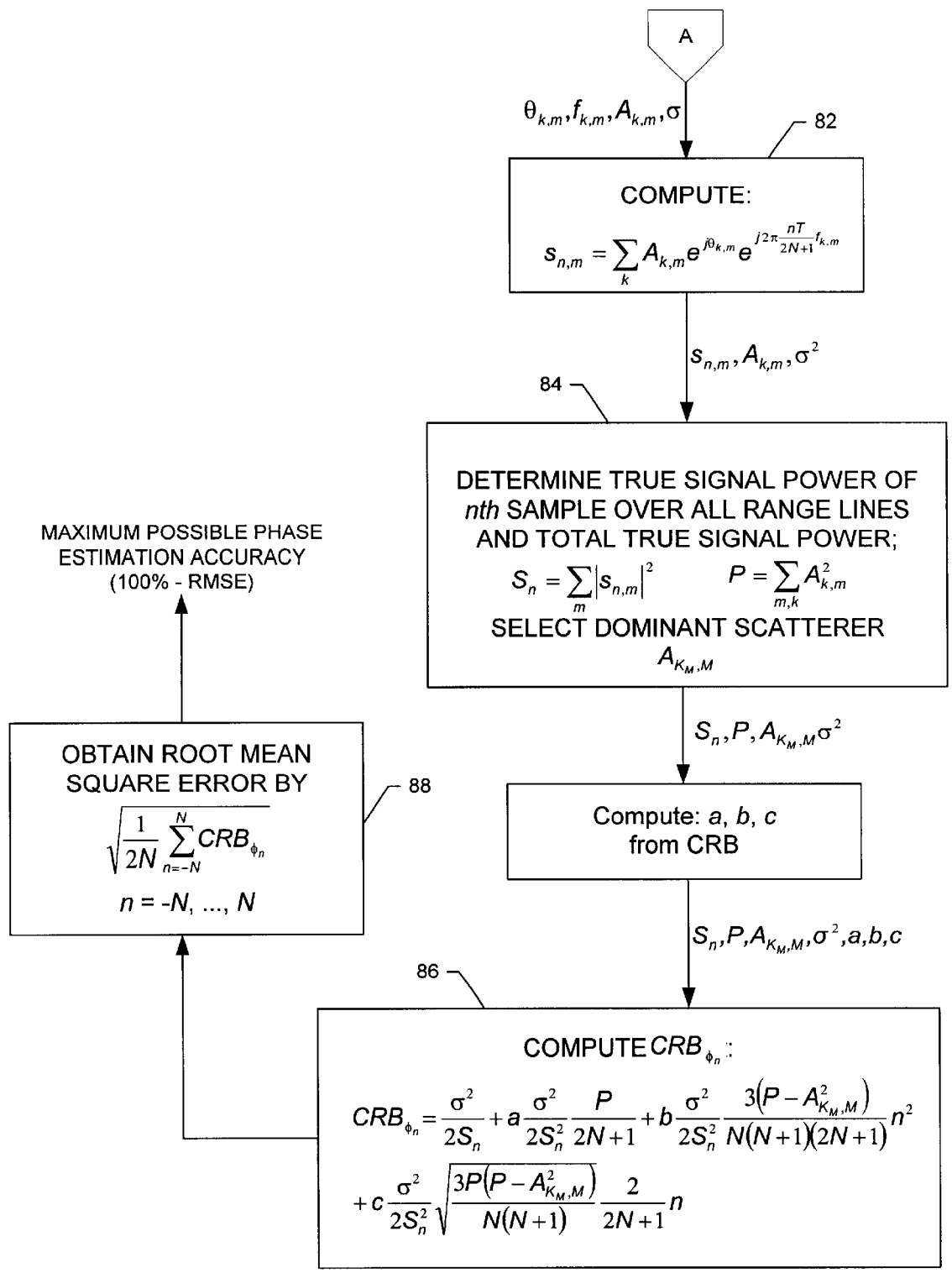

Having thus described the invention in general terms, reference will now be made to the accompanying drawings, which are not necessarily drawn to scale, and wherein:

FIG. 1 is a pictorial view of an aircraft following a defined flight path and mapping terrain with a synthetic aperture radar (SAR) system according to one embodiment of the present invention;

FIG. 2 is a schematic block diagram of a SAR system according to one embodiment of the present invention;

FIG. 3 is a schematic block diagram highlighting the signal processor of the SAR system according to one embodiment of the present invention;

FIG. 4 is an operational block diagram illustrating portions of an autofocus processor according to one embodiment of the present invention;

FIG. 5 is a graph illustrating an example of an initial phase error disturbing an SAR system in slow time;

FIG. 6 is a graph illustrating an estimate of the phase error shown in FIG. 5 according to one embodiment of the present invention;

FIG. 7 is a graph illustrating the difference between the estimated phase error of FIG. 6 and the true phase error of FIG. 5 according to one embodiment of the present invention;

FIG. 8 is a graph illustrating the residual phase error after one iteration of a method of reducing error in SAR signals according to one embodiment of the present invention;

FIG. 9 is an operational block diagram illustrating a processing element for predicting performance of operation of the autofocus processor with simulated SAR data; and FIG. 10 is an operational block diagram illustrating portions of the autofocus processor highlighting estimating the phase accuracy from parameters determined by the autofocus processor according to another embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring to FIG. 2, a synthetic aperture radar (SAR) system therein is indicated generally by reference numeral 30. To briefly describe the a conventional SAR system, a radar signal having a certain frequency is generated by a transmitter 32. The generated signal is sent to a duplexer 34 where it is further transmitted to an antenna 36. The signal is then transmitted from the antenna to a particular target region such as an area of terrain 12 (see FIG. 1). A portion of the signal is reflected off the terrain back to the antenna. The received signal is transmitted back to the duplexer, which forwards the received signal to a receiver 38, which preprocesses the received signal and thereafter passes the signal to a signal processor 40.

The SAR 30 may include a stable oscillator 42 that is provided for correlating the phase relationship between the signal that is generated by the transmitter 32 and the reflected signal that is preprocessed by the receiver 38. The reflected signal received by the receiver is an analog signal. After preprocessing by the receiver, the signal processor integrates the reflected signal with other received signals over time into range lines $R_1, \ldots, R_M$ 16 (shown in FIG. 1), where each range line includes a plurality of azimuth positions $A_{-N}, \ldots, A_N$. The range lines can, in turn, be used to generate an image of the target region 12.

During preprocessing, the receiver 38 mixes the reflected signals with a reference signal from the stable oscillator 42, as described below. This results in signals each consisting of a sequence of digital pulses, where each pulse is represented by a complex number within the pulse. As known to those skilled in the art, the receiver then low pass filters the signals and slows the data rate. Thereafter, the digital signals are passed to the signal processor 40.

Operating in spotlight mode, the antenna 36 typically stays pointed to a fixed area on the ground whose center point is used as the scene center. Thus, referring now to FIG. 3, within the signal processor, a motion compensator 44 adjusts the phase of the digital signals so the scene center is at DC. In other words, the motion compensator subtracts the phase contribution from the scene center from each of the digital signals. In this regard, the motion compensator receives motion information from a motion sensor 46. The motion sensor can include any of a number of known devices but, according to one embodiment, the motion sensor includes an inertial navigation system (INS) that senses position information concerning the aircraft 10 can be used to calculate the position of the antenna. Typically, the motion sensor further includes a reference function processor that generates an antenna position signal from the position information from the INS. The antenna position signal is then transmitted to the motion compensator.

After the motion compensator 44 has adjusted the phase of the digital signals, a polar formatter 48 reformats the digital signals. In this regard, the polar formatter takes the digital signals which represent points on a polar grid and interpolates the digital signals to a Cartesian grid. The reformatted digital signals are then passed to a range compressor 50, which compresses the radar energy of the digital signals in the range dimension. As is known to those skilled in the art, the range compressor compresses the radar energy via a Fourier transform along the range lines or fast time samples (i.e. samples with respect to the frequency band of the radar). Now along ranges where significant target returns exist, the digital signals have strong signal components sampled in slow time.

The digital signals at the output of the range compressor 50 carry information about target scatterers in the azimuth positions and phase errors that need to be removed before a clear SAR image of the scene can be obtained. Thus, the digital signals proceed from the range compressor to an autofocus processor 52, which corrects for phase errors present in the returns along slow time. In this regard, operation of the autofocus processor in accordance with the present invention will be described below. After the autofocus processor 52 has corrected for the phase errors, the digital signals pass to an azimuthial compressor 54, which is composed of a Fourier transform along slow time, as such will be appreciated by those skilled in the art. Finally, the digital signals proceed to an image calibrator 56, which calibrates the image for antenna patterns and other known distortions on the image, as also known to those skilled in the art.

Operation of the autofocus processor 52 will now be described in accordance with embodiments of the present invention. Without loss of generality, the digital signals representing the received radar signals entering the autofocus processor, which are referred to as the phase history of the received signals, can be modeled as consisting of target and clutter returns which are corrupted by phase noise and additive Gaussian receiver/processor noise. It is also commonplace to view the signals as having been filtered to a small patch on the target, typically referred to as a micropatch. Within a micropatch, then, the phase errors remain the same over all of the range lines. The clutter return can be modeled as consisting of the highlights (target like) and the residual, which is uniform and uncorrelated. In general, clutter is correlated from pulse to pulse, however, it is not unreasonable to assume that micropatch uniform clutter returns are uncorrelated. In this regard, as modeled, specular/granular clutter returns can be made part of target return. Also, as modeled, receiver noise is assumed to be uncorrelated.

As is known to those skilled in the art, the phase history from the return at the micropatch level can be modeled in terms of slow-time samples, or azimuth positions, from several range cells as:

$$x_{n,m} = \sum_{k} z_{k,m} e^{i2\pi f_{k,m} nT/(2N+1)} e^{j\phi_n} + c_{n,m} + v_{n,m}, \quad (1)$$

In equation (1), n represents each of a total of 2N+1 azimuth positions or slow-time samples (i.e., n=-N, ..., 0, ..., N), and m represents each of a total of M range lines or fast-time samples (i.e., m=1, ..., M). Also in equation (1), k represents an enumeration of the point scatterers in a given range line, $f_{k,m}$ represents the Doppler frequency of the kth point scatterer at the mth range line, T represents the Dwell duration, $\phi_n$ represents the phase error of the signal at the nth azimuth position for all of the range lines, $c_{n,m}$ represents the clutter return of the nth azimuth position at the mth range line, and $v_{n,m}$ represents the receiver noise of the nth azimuth position at the mth range line. Further, $z_{k,m}$ represents the scattering amplitude and initial phase of the kth point scatterer at the mth range line. In this regard, $z_{k,m}$ can be represented as follows:

$$z_{k,m} = A_{k,m} e^{j\theta_{k,m}}, \quad (2)$$

where $A_{k,m}$ represents the scattering amplitude, and $\theta_{k,m}$ represents the initial phase.

According to the present invention, the autofocus processor simultaneously estimates the unknowns $z_{k,m}$, $\phi_n$, and $f_{k,m}$ according to a technique referred to herein as the Maximum Likelihood Estimator Autofocus (MLEAF) method. In this regard, by estimating the unknowns $z_{k,m}$, $\phi_n$, and $f_{k,m}$ according to the MLEAF method, the autofocus processor can produce the needed phase compensations for the SAR system 30.

Mathematically and using the given samples and signal model, the MLEAF method operates by maximizing the log-likelihood function as:

$$\underset{\substack{\{f_{k,m}\}_{k,m} \\ \{\phi_n\}_m}}{\text{Max}} \left\{ \sum_m \vec{x}_m^* D E_m (E_m^* E_m)^{-1} E_m^* D^* \vec{x}_m \right\} \quad (3)$$

Equivalently, the MLEAF method can operate by minimizing the least squares functional:

$$\underset{\substack{\{f_{k,m}\}_{k,m} \\ \{\phi_n\}_n,\{z_{k,m}\}}}{\text{Min}} \sum_m \left\| \vec{x}_m - D E_m \vec{z}_m \right\|^2 \quad (4)$$

In equations (3) and (4), $\vec{x}_m$ represents a vector of azimuth positions at the mth range line and can be represented as follows:

$$\vec{x}_m = \begin{bmatrix} x_{-N,m} \\ \vdots \\ x_{n,m} \\ \vdots \\ x_{N,m} \end{bmatrix} \quad (5)$$

The variable D, which represents a (2N+1) by (2N+1) diagonal random phasor matrix that contains all phase errors, can be represented as follows:

$$D = D(e^{j\phi_{-N}}, \ldots, e^{j\phi_N}) \quad (6)$$

The variable $E_m$ represents the Doppler steering matrix at the mth range line and, thus, $E_m$ contains the information about the Doppler frequencies of the scatterers. In this regard, $E_m$ can be represented as follows:

$$E_m = \quad (7)$$

$$E(f_{1,m}, \cdots, f_{K,m}) = \begin{bmatrix} e^{2\pi j f_{1,m} t_{-N}} & \cdots & e^{2\pi j f_{k,m} t_{-N}} & \cdots & e^{2\pi j f_{K,m} t_{-N}} \\ \vdots & \cdots & \vdots & \cdots & \vdots \\ e^{2\pi j f_{1,m} t_n} & \cdots & e^{2\pi j f_{k,m} t_n} & \cdots & e^{2\pi j f_{K,m} t_n} \\ \vdots & \cdots & \vdots & \cdots & \vdots \\ e^{2\pi j f_{1,m} t_N} & \cdots & e^{2\pi j f_{k,m} t_N} & \cdots & e^{2\pi j f_{K,m} t_N} \end{bmatrix}$$

where $$t_n = \frac{nT}{2N+1}$$

is the sampling time instant.

Also, as used in equation (4), $\vec{z}_m$ represents a vector of complex amplitudes of the scatterers at the mth range line, and can be represented as:

$$\vec{z}_m = \begin{bmatrix} z_{1,m} \\ \vdots \\ z_{K_m,m} \end{bmatrix} \quad (8)$$

Looking at the least squares functional of equation (4), the object is to find an optimally accurate set of phase and pure signal parameters: $\{z_{k,m}, \phi_n, f_{k,m}\}$, and use the parameters to reconstruct the pure range line samples so that the discrepancy from the observed range line samples is minimized.

The optimization procedures needed to determine the solution from the above data samples is complicated by the nonlinearity of the functional of equation (3) that needs to be maximized and by the large number of unknowns that are estimated. In this regard, the number of unknowns is approximately equal to the number of scatterers on the micropatch plus the number of slow-time (azimuth) samples and can number in the thousands for typical cases. The MLEAF method is a method for computing this maximum with a reasonable computational effort which separates the minimization over the frequency variables and the phase variables. In other words, the MLEAF method provides a real-time solution to the very complex optimization. Advantageously, the MLEAF method uses superresolution processing to estimate the scatterers' frequency at each range cell. As is known to those skilled in the art, superresolution processing is a method of reconstructing unaliased, high-resolution SAR images. The use of superresolution has the advantage of estimating these frequencies with the highest possible precision. Thus, superresolution facilitates the reconstruction of the specular component of the signal very accurately. As a result, the pure signal component samples (scatterers plus clutter discretes) at each range line are estimated more accurately and when used in the phase correction, as described below, more accurate phase corrections result. Advantageously, this is the case even when several scatterers are closely spaced, such as within the resolution limits of a Fourier processing system. In this regard, when several scatterers are closely spaced, as such, many prior phase (pulse pair) comparison techniques suffer from lack of accuracy due to coupling of closely spaced signal components.

It should be noted that the MLEAF method employs the Constrained Total Least Squares (CTLS) technique for superresolution, which has been shown to be the most accurate and robust at lower signal-plus-clutter-to-noise ratios. The use of CTLS here overcomes one of the shortcomings of other techniques based on phase differencing or sharpness whose performance suffers in the presence of closely spaced frequency scatterers or low signal-plus clutter-to-noise ratios.

Referring to FIG. 4, a functional block diagram of the autofocus processor operating according to the MLEAF method is shown. As shown in block 58, according to the first step in the MLEAF method, the autofocus processor initializes the method by receiving the vectors $\{\vec{x}_m\}$ of the range lines and thereafter obtaining an estimate of an initial phase $\hat{\phi}_n$ for each slow-time (azimuth) sample. To obtain the estimates, the autofocus processor first finds the frequency component of largest magnitude on each range line and translates that frequency component to DC (i.e., 0 Hz). In this regard, presume the largest frequency magnitude component $f_m$ is found at the mth range line. Next, the corresponding slow-time samples are translated according to the following:

$$\tilde{x}_{n,m} = x_{n,m} e^{-2\pi j f_m t_n} \quad (9)$$

The component amplitudes are estimated as:

$$\tilde{z}_m = \frac{1}{N} \sum_n \tilde{x}_{n,m} \quad (10)$$

And the initial phase estimates are then obtained from:

$$\hat{\phi}_n = \arg\left\{\sum_m \tilde{x}_{n,m} \bar{\tilde{z}}_m\right\}; \quad n = -N, \ldots, N \quad (11)$$

As used in the MLEAF method, the initial phase estimates $(\hat{\phi}_{-N}, \ldots, \hat{\phi}_N)$ represent a normalization.

Shown in FIG. 5 is an example of an initial phase error disturbing an SAR system in slow time. This type of error will typically cause a degradation in the SAR image and, thus, is preferably compensated out of the received radar signals according to the MLEAF method. In this regard, initialization of the MLEAF method attempts to estimate the phase error. The estimate is shown in FIG. 6, and the difference between the estimated phase error and the true phase error appears in FIG. 7. As shown, the phase discrepancy between the estimated error and true error is still substantial, but seems more manageable.

After the initial phase estimate has been obtained, the range-compressed samples are compensated by the obtained initial phase estimates $(\hat{\phi}_{-N}, \ldots, \hat{\phi}_N)$, as shown in block 60. The autofocus processor compensates the samples by first forming the diagonal random phasor matrix D, such as according to equation (6). Then, phase-compensated range line samples, $\vec{y}_m$, can be determined by multiplying the complex conjugate of the diagonal random phasor matrix by the range line vectors $\vec{x}_m$, which can be shown notionally in equation (12) as follows:

$$\vec{y}_m = D^* \vec{x}_m, \quad (12)$$

where D* represents the complex conjugate of D.

Next, as shown in block 62, the phase-compensated range line samples, $\vec{y}_m$, are processed according to a superresolution signal processing method employing the Constrained Total Least Squares (CTLS) parameter estimation technique. In this regard, the phase compensated range line samples, $\vec{y}_m$, are fitted in a least squares sense to a set of complex sinusoids of unknown complex amplitude and frequency, where each sinusoid corresponds to a target scatterer or clutter discrete. By employing superresolution processing according to the CTLS technique, the main/dominant Doppler frequencies $\{\hat{f}_{k,m}\}$ of each point scatterer at each range line can be obtained. According to superresolution processing, the set of sinusoids is estimated from the slow-time samples $\vec{x}_m$, and a linear prediction model is fitted to the slow-time samples. The CTLS technique is then used to solve for linear prediction coefficients. Next, the Doppler frequencies are obtained from the roots of a polynomial including the linear prediction coefficients. It should be noted that the residual to the least squares sinusoidal fit can be taken to be the uniform clutter+thermal noise power: $\sigma^2$. Such a superresolution processing method employing the CTLS technique is described further in U.S. Pat. No. 5,748,507, the contents of which is hereby incorporated by reference in its entirety.

After determining the Doppler frequencies of the scatterers, the frequencies can then be used to determine a reconstructed true signal $\hat{z}_m$ for each range line, as shown in block 64. To determine the reconstructed true signals, the autofocus processor first forms the Doppler frequency steering matrices $\hat{E}_m$ from the main Doppler frequencies $\{\hat{f}_{k,m}\}$, such as according to equation (7). Thus, the Doppler frequency steering matrices $\hat{E}_m$ can be represented as follows:

$$\hat{E}_m = E(\hat{f}_{1,m}, \ldots, \hat{f}_{K,m}) \quad (13)$$

After determining the Doppler frequency steering matrices, the vector of complex amplitudes of the scatterers at each range cell can be determined according to the following:

$$\hat{z}_m = (\hat{E}_m^* \hat{E}_m)^{-1} \hat{E}_m^* \vec{y}_m \quad (14)$$

Then, following determining the vectors of complex amplitudes of the scatterers, the reconstructed true signal for each range line, $\hat{s}_m$, can be determined by multiplying the respective Doppler frequency steering matrix $\hat{E}_m$ with the complex amplitude $\hat{z}_m$. Written notationally, the reconstructed true signal $\hat{s}_m$ can be determined as follows:

$$\hat{s}_m = \hat{E}_m \hat{z}_m \quad (15)$$

As shown in block 66, the reconstructed true signal $\hat{s}_m$ and phase compensated range line samples, $\vec{y}_m$, can be exploited to obtain a correction to the estimated phase according to the following equation (16):

$$\delta\hat{\phi}_n = \arg\left\{\sum_m y_{n,m}\bar{\hat{s}}_{n,m}\right\}; \quad n = -N, \ldots, N \tag{16}$$

The correction is based on the least squares estimate of the residual phase error based on the given phase compensated range line samples, $\vec{y}_m$, and the signal target component reconstruction, $\hat{z}_m$. Also, as described below, the reconstructed true signal $\hat{z}_m$ and the vector of complex amplitude $\hat{z}_m$ can be used to predict performance of the autofocus processor 52 and, thus the MLEAF method.

Then, as shown in block 68, the autofocus processor checks the correction to the estimated phase, $\delta\hat{\phi}_n$, for convergence. If the root mean square error (RMSE) of the correction is greater than a predetermined threshold, the estimated phase is set to the correction and the vector $\vec{x}_m$ of each range line is set to the phase compensated range line sample, $\vec{y}_m$, for the respective range line. The threshold can be set at any of a number of values, such as 0.5 degrees, which can decrease if the scene has a low target content. The MLEAF method then repeats beginning with compensating the set vectors $\vec{x}_m$ (at block 60).

Consider the phase error and initial estimate of the phase error shown in FIGS. 5 and 6, and the differential shown in FIG. 7. As shown in FIG. 8, then, after completing one iteration through the MLEAF method, the resulting residual phase error has been reduced further. Repeated iterations of the MLEAF method will typically further reduce the residual phase error. The number of iterations through the MLEAF method can vary depending upon the true phase error, but convergence sufficient enough bring the RMSE of the phase correction below the threshold typically occurs after 5 to 20 iterations. Further, it can be possible to speed up the rate of convergence by applying the Newton method for minimizing a function of several variables, as will be appreciated by those skilled in the art.

Performance of the MLEAF method, assuming it converges, can be predicted by the Cramer Rao Bound (CRB). As is known, the CRB yields the lowest bound on the covariance that any unbiased estimator can attain. The CRB is typically computable in closed analytic form and, as such, it has value in predicting performance of signal parameter estimators and, in particular, those appearing in the phase of superimposed signals such as tones, chirps, etc. Generally, the CRB is a local estimator such that its prediction is good above a certain threshold Signal to Clutter+Noise ratio (SCNR), which usually coincides with the operational range of most radar processing algorithms. The variance of the MLEAF phase-error estimator is given by a quadratic function of the slow-time sample index and depends upon parameters such as the signal-to-noise, signal-to-clutter ratios, the number of samples, etc. Advantageously, all such parameters can be pre-computed in closed analytic form to either predict performance of the MLEAF method before implementation or estimate the phase accuracy from the measured parameters.

In predicting the performance of the MLEAF method, the CRB is computed from the inverse of the Fisher information matrix J, where J is defined by:

$$J = -E\left\{\frac{\partial^2 \Lambda}{\partial \gamma_i \partial \gamma_j}\right\}_{i,j} \tag{17}$$

In equation (17), E represents the expectation operator, $\Lambda$ represents log-likelihood function of the measurements in terms of the signal model. Also, $\gamma_i$ represent the signal parameters being estimated. In this regard, the signal parameters can be identified as follows:

$$\gamma_{3k-2,m} = A_{k,m}$$

$$\gamma_{3k-1,m} = \theta_{k,m}$$

$$\gamma_{3k,m} = f_{k,m}$$

$$\gamma_{K_{tot}+n+N+1} = \phi_n$$

In identifying the parameters, k=1, ..., $K_m$; m=1, ..., M; and $K_{tot}$ is represented as follows:

$$K_{tot} = 3\sum_{m=1}^{M} K_m - 1 \tag{18}$$

For the sake of normalization, $\phi_0$ and $f_{K_M,M}$ are both set to zero. A basic assumption is also made that the dominant scatterer is located at the Mth range line at DC, i.e., 0 Hz, and the dominant scatterer has an amplitude, $A_{K_M,M}$. Also, for the special case where specular clutter is included in the target return, the residual clutter from a micropatch and receiver noise can be modeled as uniform white noise with correlation matrix R of clutter plus receiver noise equal to:

$$R = (\sigma_c^2 + \sigma_v^2)I, \tag{19}$$

where I represents the identity matrix, and $\sigma_c^2, \sigma_v^2$ are the uniform clutter and receiver noise power, respectively. In this regard, as shown in block 70 of FIG. 9, clutter-plus-receiver noise $\sigma^2$ can be computed according to the following:

$$\sigma^2 = \sigma_c^2 + \sigma_v^2 \tag{20}$$

For the radar returns in clutter slow-time samples, then, the likelihood function can be expressed as $$\Lambda = -\frac{1}{\sigma^2}\sum_m (\vec{x}_m - DE_m\vec{z}_m)*(\vec{x}_m - DE_m\vec{z}_m), \tag{21}$$

The Fisher information matrix that describes the coupling among the scattering parameters $\{A_{k,m}, \theta_{k,m}, f_{k,m}\}$ and phase parameters $\{\phi_n\}$ can be represented as a block matrix, where each block corresponds to the range line m, and has the form:

$$J = \begin{bmatrix} J_1 & 0 & \cdots & \cdots & 0 & J_{1\Phi} \\ 0 & \ddots & \ddots & & \vdots & \vdots \\ \vdots & \ddots & J_m & \ddots & \vdots & J_{m\Phi} \\ \vdots & & \ddots & \ddots & 0 & \vdots \\ 0 & \cdots & \cdots & 0 & J_M & J_{M\Phi} \\ J_{1\Phi}^T & \cdots & J_{m\Phi}^T & \cdots & J_{M\Phi}^T & J_\Phi \end{bmatrix} \quad (22)$$

As also shown in block 70, as well as in equation (22), the Fisher information matrix, $J_m$, represents the scattering parameters $sc_m = \{A_{k,m}, \theta_{k,m}, f_{k,m}\}_{k=1}^{K_m}$ and, as such, the scattering parameters can be identified from $J_m$. The Fisher matrix $J_{m\Phi}$, then, is the coupling matrix between scattering parameters $sc_m$ and phases $\{\phi_n\}_{-N}^{N}$, for the mth range line. In this regard, $J_\Phi$ is the Fisher matrix for the phase parameters $\{\phi_n\}_{-N}^{N}$.

In computing the CRB as the inverse of J, the covariance of the scattering parameters and unknown phases are of primary concern. In this regard, it is reasonable to assume that the minimum Doppler frequency separation between two scatterers within the same range line exceeds 1/T, where T equals the Dwell duration. Such an assumption simplifies the expression for the Fisher matrix J. Then, as shown in block 72, in predicting the performance of the MLEAF method using a virtual SAR scene consisting of a multiplicity of point scatterers per range line, the true signal, $s_{n,m}$, can be represented as:

$$s_{n,m} = \sum_{k'} A_{k',m} e^{j\theta_{k',m}} e^{j2\pi n T/(2N+1) f_{k',m}} \quad (23)$$

where k' represents the index of the point scatterer in the mth range line. Next, as shown in block 74, the true signal power of the nth sample summed over all range lines, $S_n$, and the total true signal power, P, as well as the diagonal matrix of $S_n$, can be defined as follows:

$$S_n = \sum_m |s_{n,m}|^2 \quad (24)$$

$$P = \sum_{m,k} A_{k,m}^2 \quad (25)$$

$$S = \text{diag}(S_n) \quad (26)$$

By defining $S_n$, S and P as such, analytic form equations for the CRB for phase and scattering parameters can be obtained. As shown in block 76, the CRB for $\phi_n$ can then be represented as a quadratic function of the pulse number n:

$$CRB_{\phi_n} = \frac{\sigma^2}{2S_n} + a\frac{\sigma^2}{2S_n^2}\frac{P}{2N+1} + b\frac{\sigma^2}{2S_n^2}\frac{3(P - A_{K_M,M}^2)}{N(N+1)(2N+1)}n^2 + c\frac{\sigma^2}{2S_n^2}\sqrt{\frac{3P(P - A_{K_M,M}^2)}{N(N+1)}}\frac{2}{2N+1}n \quad (27)$$

In equation (27), variables a, b and c can be defined as follows:

$$a = (2N+1)\frac{\sum_n\left(1 - \frac{P - A_{K_M,M}^2}{S_n}\right)n^2}{\sum_n\left(1 - \frac{P - A_{K_M,M}^2}{S_n}\right)n^2\left(\sum_{n\neq 0}\left(1 - \frac{P}{S_n}\right) + 1\right) - P(P - A_{K_M,M}^2)\left(\sum_n \frac{n}{S_n}\right)^2} \quad (28)$$

$$b = \frac{N(N+1)(2N+1)}{3} \times \frac{\left(\sum_{n\neq 0}\left(1 - \frac{P}{S_n}\right) + 1\right)}{\sum_n\left(1 - \frac{P - A_{K_M,M}^2}{S_n}\right)n^2\left(\sum_{n\neq 0}\left(1 - \frac{P}{S_n}\right) + 1\right) - P(P - A_{K_M,M}^2)\left(\sum_n \frac{n}{S_n}\right)^2} \quad (29)$$

$$c = (2N+1)\sqrt{\frac{N(N+1)}{3}} \times \frac{\sqrt{P(P - A_{K_M,M}^2)}\left(\sum_n \frac{n}{S_n}\right)}{\sum_n\left(1 - \frac{P - A_{K_M,M}^2}{S_n}\right)n^2\left(\sum_{n\neq 0}\left(1 - \frac{P}{S_n}\right) + 1\right) - P(P - A_{K_M,M}^2)\left(\sum_n \frac{n}{S_n}\right)^2} \quad (30)$$

In the special case of a scatterer per range line, the complexity of the CRB can be further reduced by taking advantage of the form of the diagonal random phasor matrix, D, and since only one scatterer exists in every range cell, i.e., k=1. In reducing the complexity, S, P and D can now be represented as follows:

$$S = PI \quad (31)$$

$$P = \sum_m A_m^2 \quad (32)$$

$$D = \frac{2P}{\sigma^2}I \quad (33)$$

In equation (31), I represents a 2N by 2N identity matrix where all the elements are zero except for ones along the main diagonal. The variables a and b can be simplified as:

$$a = 2N+1 \quad (34)$$

$$b = \frac{S}{A_{K_M,M}^2} \quad (35)$$

Also, note that c=0, because $$\sum_n \frac{n}{S_n} = 0$$

as $S_n$ is a constant.

The diagonal of CRBφ can be represented as:

$$diag(CRB_\Phi) = \frac{\sigma^2}{P}\left[I + \frac{3}{2N(N+1)(2N+1)}\frac{P - A_{K_M,M}^2}{A_{K_M,M}^2}n^2\right], \quad (36)$$

where n=−N, ..., N.

And the CRB for $\phi_n$ can be simplified as follows:

$$CRB_{\phi_n} = \frac{\sigma^2}{P}\left[1 + \frac{3}{2N(N+1)(2N+1)}\frac{P - A_{K_M,M}^2}{A_{K_M,M}^2}n^2\right] \quad (37)$$

Further, the variance of the scattering parameters for the mth range cell are computed to the following:

$$CRB_{A_m} = \frac{\sigma^2}{2(2N+1)} \quad (38)$$

$$CRB_{\theta_m} = \frac{\sigma^2}{2(2N+1)A_m^2}\frac{P + 2NA_m^2}{P} \quad (39)$$

$$CRB_{f_m} = \frac{3}{8\pi^2 T^2}\frac{2N+1}{N(N+1)}\frac{\sigma^2}{A_m^2}\frac{A_m^2 + A_M^2}{A_M^2} \quad (40)$$

After determining the functions for the CRB, an error computation for the MLEAF method can be determined, such as by determining the root mean square error (RMSE) of the CRB. In this regard, as shown in block 78, the RMSE can be determined as follows:

$$RMSE = \sqrt{\frac{1}{2N}\sum_{n=-N}^{N} CRB_{\phi_n}} \quad (41)$$

For example, the table below includes assumed parameters for several different SAR scenarios and the resulting RMSE.

| Total Signal to Noise Power $\frac{P}{\sigma^2}$ | Main Scatterer to Total Signal Power $\frac{A_{K_M,M}^2}{P}$ | Number of Slow-Time Samples 2N+1 | Maximum Likelihood Estimate Standard Deviation for $\phi_n$ $\sqrt{CRB_{\phi_n}}$ | Maximum Standard Deviation for Phase Estimate $\sqrt{CRB_{\phi_n}}$ | Root Mean Square Error (RMSE) of Phase Estimate $\sqrt{\frac{1}{2N}\sum_{n=-N}^{N} CRB_{\phi_n}}$ |
|---|---|---|---|---|---|
| 30 | 1/10 | 257 | $\sqrt{\frac{1}{30}(1 + 3.18 \times 10^{-6} n^2)}$ | 10.73° | 10.55° |
| 30 | 1/30 | 257 | $\sqrt{\frac{1}{30}(1 + 1.02 \times 10^{-5} n^2)}$ | 11.30° | 10.75° |
| 100 | 1/5 | 257 | $\sqrt{\frac{1}{100}(1 + 1.41 \times 10^{-6} n^2)}$ | 5.80° | 5.75° |
| 100 | 1/30 | 257 | $\sqrt{\frac{1}{100}(1 + 1.02 \times 10^{-5} n^2)}$ | 6.19° | 5.89° |
| 10 | 1/10 | 257 | $\sqrt{\frac{1}{10}(1 + 3.18 \times 10^{-6} n^2)}$ | 18.58° | 18.28° |

From the RMSE, then, the maximum possible phase estimation accuracy can be determined as 100%−RMSE.

As stated above, in addition to predicting performance of the MLEAF method before operation of the autofocus processor 52, performance of the MLEAF method during operation of the autofocus processor can be determined by estimating the estimating the phase accuracy from the measured scattering parameters: $sc_m = \{A_{k,m}, \theta_{k,m}, f_{k,m}\}_{k=1}^{K_m}$, where m=1, ..., M. In this regard, referring now to FIG. 10, the clutter-plus-receiver noise power $\sigma^2$ is preferably precomputed (see block 62 of FIG. 3). Also, the scattering amplitudes $A_{k,m}$, can be determined from the scattering amplitudes and initial phases of the point scatterers, $z_{k,m}$, as $z_{k,m}$ is determined by the autofocus processor (see block 64 of FIG. 3). As shown in block 82, then, the autofocus processor can determine the true signals $s_{n,m}$, such as according to equation (15). As illustrated in blocks 84, 86 and 88, with the scattering amplitudes $A_{k,m}$ and true signals $S_{n,m}$ the method of predicting performance of the MLEAF method can continue as before to determine the RMSE of the phase estimation. Thus, as before, the accuracy of the phase estimation can be identified as 100%–RMSE.

The methods of the present invention is generally implemented by one or more computer processing elements, such as microprocessors or the like. For example, all or a portion of the methods can be performed by the autofocus processor 52 which, in turn, may be comprised of one or more computer processing elements, such as microprocessors or the like. The computer processing elements typically operate under the control of a computer program product. The computer program product includes a computer-readable storage medium, such as a non-volatile storage medium, and computer-readable program code portions, such as a series of computer instructions, embodied in the computer-readable storage medium. Typically, the computer program product is stored by the computer processing element or a related memory device.

Therefore, the present invention provides an improved system, method and computer program product for reducing errors in synthetic aperture radar (SAR) signals. The system, method and computer program product of embodiments of the present invention implement maximum likelihood estimation for autofocusing SAR signals to reduce errors in SAR signals. In this regard, the present invention reduces errors to achieve more accurate return signals than conventional systems, particularly at low signal/clutter-to-noise ratios and in situations where multiple scatterers are present in the same range line. Advantageously, the system, method and computer program product use of superresolution processing along the slow-time, or azimuth, positions to separate closely spaced scatterers on the same range lines and estimate the signal plus clutter components with higher fidelity.

In this regard, FIGS. 2, 3 and 4 are block diagrams and control flow illustrations of methods, systems and program products according to the invention. It will be understood that each block or step of the block diagram, flowchart and control flow illustrations, and combinations of blocks in the block diagram, flowchart and control flow illustrations, can be implemented by computer program instructions. These computer program instructions may be loaded onto a computer or other programmable apparatus to produce a machine, such that the instructions which execute on the computer or other programmable apparatus create means for implementing the functions specified in the block diagram, flowchart or control flow block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the block diagram, flowchart or control flow block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block diagram, flowchart or control flow block(s) or step(s).

Accordingly, blocks or steps of the block diagram or control flow illustrations support combinations of means for performing the specified functions, combinations of steps for performing the specified functions and program instruction means for performing the specified functions. It will also be understood that each block or step of the block diagram, flowchart or control flow illustrations, and combinations of blocks or steps in the block diagram, flowchart or control flow illustrations, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of reducing errors in synthetic aperture radar signals from a plurality of range lines where each range line includes a plurality of azimuth positions, said method comprising:

receiving a plurality of slow-time samples representing radar signals for a plurality of azimuth positions for a plurality of range lines;

estimating a phase error for each slow-time sample;

compensating the plurality of slow-time samples by the estimated phase errors to obtain a plurality of range-line samples;

processing the range-line samples according to a super-resolution signal processing technique to thereby obtain a plurality of Doppler frequencies for a plurality of point scatterers at each range line;

reconstructing a true signal for each range line based upon the plurality of Doppler frequencies; and obtaining a correction to the estimated phase error for each slow-time sample based upon the range-line samples and the true signals.

2. A method according to claim 1, wherein, if a root mean square error (RMSE) of the correction to the estimated phase error for each slow-time sample is greater than a predetermined threshold, said method further comprises replacing the slow-time samples with the range-line samples and thereafter repeating the compensating, processing, reconstructing, obtaining and replacing steps until the RMSE of the correction for each slow-time sample is less than the predetermined threshold.

3. A method according to claim 1, wherein processing the range-line samples comprises processing the range-line samples according to a superresolution signal processing technique including Constrained Total Least Squares parameter estimation.

4. A method according to claim 1, wherein compensating the plurality of slow-time samples comprises compensating the plurality of slow-time samples based upon a diagonal random phasor matrix.

5. A method according to claim 4, wherein compensating the plurality of slow-time samples comprises multiplying the slow-time samples $\vec{x}_m$ by a complex conjugate of the diagonal random phasor matrix to obtain a plurality of range-line samples, $\vec{y}_m$ wherein $\vec{x}_m$ represents a plurality of slow-time samples for each range line m, and $\vec{y}_m$ represents a plurality of range-line samples for each range line.

6. A method according to claim 1, wherein reconstructing a true signal comprises reconstructing a true signal based upon a plurality of Doppler frequency steering matrices, $\hat{E}_m$, wherein the plurality of Doppler frequency steering matrices are represented as follows:

$$\hat{E}_m = E(\hat{f}_{1,m}, \ldots, \hat{f}_{K,m}),$$

and wherein $\hat{f}_{k,m}$ represents the Doppler frequency for each of K point scatterers at each range line m.

7. A method according to claim 6, wherein reconstructing a true signal $\hat{s}_m$ for each range line comprises reconstructing the true signal according to the following:

$$\hat{s}_m = \hat{E}_m \hat{z}_m,$$

and wherein $\hat{z}_m$ represents a plurality of complex amplitudes of the scatterers at each range line.

8. A method according to claim 7, wherein reconstructing a true signal further comprises determining the plurality of complex amplitudes of the scatterers at each range line according to the following:

$$\hat{z}_m = (\hat{E}_m^* \hat{E}_m)^{-1} \hat{E}_m^* \vec{y}_m,$$

and wherein $\vec{y}_m$ represents a plurality of range-line samples for each range line.

9. A method according to claim 7, wherein obtaining a correction comprises obtaining a correction $\delta\hat{\phi}_n$ to the estimated phase error for each slow-time sample according to the following:

$$\delta\hat{\phi}_n = arg\left\{\sum_m y_{n,m} \bar{\hat{s}}_{n,m}\right\},$$

and wherein $n = -N, \ldots, 0, \ldots N$ represents each of 2N+1 slow-time samples at each range line.

10. A method of determining an accuracy of estimated phase errors in synthetic aperture radar signals, wherein the signals are from a plurality of range lines that each includes a plurality of azimuth positions, said method comprising:
  calculating true signals for a plurality of slow-time samples for the plurality of range lines, wherein the plurality of slow-time samples represent radar signals for a plurality of azimuth positions for a plurality of range lines;
  determining a true signal power for each slow-time sample summed over the plurality of range lines and a total true signal power, wherein the true signal powers are based upon the true signals and the total true signal power is based upon amplitudes of the scatterers;
  determining a Cramer Rao Bound (CRB) based upon a clutter-plus-receiver noise power, the true signal powers, a dominate scatterer power, the number of slow time samples and the total true signal power; and
  determining a root mean square error based upon the CRB.

11. A method according to claim 10 further comprising estimating the clutter-plus-receiver noise power based upon a uniform clutter noise and a receiver noise model, wherein the clutter-plus-receiver noise power is determined before determining the CRB.

12. A method according to claim 10 further comprising selecting a plurality of signal scatterer parameters, wherein the plurality of point scatterer parameters are determined before determining the true signals, and wherein calculating the true signals is based upon the point scatterer parameters.

13. A method according to claim 10, wherein calculating the true signals comprises:
  receiving the plurality of slow-time samples and thereafter estimating a phase error for each slow-time sample;
  compensating the plurality of slow-time samples by the estimated phase errors to obtain a plurality of range-line samples;
  processing the range-line samples according to a super-resolution signal processing technique to thereby obtain a plurality of Doppler frequencies for a plurality of point scatterers at each range line; and
  reconstructing a true signal for each range line based upon the plurality of Doppler frequencies.

14. A system for reducing errors in synthetic aperture radar signals from a plurality of range lines where each range line includes a plurality of azimuth positions, said system comprising:
  an autofocus processor capable of receiving a plurality of slow-time samples representing radar signals for a plurality of azimuth positions for a plurality of range lines, wherein said autofocus processor is also capable of estimating a phase error for each slow-time sample and thereafter compensating the plurality of slow-time samples by the estimated phase errors to obtain a plurality of range-line samples, wherein said autofocus processor is further capable of processing the range-line samples according to a superresolution signal processing technique to thereby obtain a plurality of Doppler frequencies for a plurality of point scatterers at each range line, wherein said autofocus processor is further capable of reconstructing a true signal for each range line based upon the plurality of Doppler frequencies and thereafter obtaining a correction to the estimated phase error for each slow-time sample based upon the range-line samples and the true signals.

15. A system according to claim 14, wherein said autofocus processor is also capable of replacing the slow-time samples with the range-line samples when a root mean square error (RMSE) of the estimated phase error correction for each slow-time sample is greater than a predetermined threshold, wherein said autofocus processor is additionally capable of compensating the slow-time samples, processing the range-line samples, reconstructing the true signal, obtaining the correction, and replacing the slow-time samples until the RMSE of the correction for each slow-time sample is less than the predetermined threshold.

16. A system according to claim 14, wherein said autofocus processor is capable of processing the range-line samples according to a superresolution signal processing technique including Constrained Total Least Squares parameter estimation.

17. A system according to claim 14, wherein said autofocus processor is capable of compensating the plurality of slow-time samples based upon a diagonal random phasor matrix.

18. A system according to claim 17, wherein said autofocus processor is capable of compensating the plurality of slow-time samples by multiplying the slow-time samples $\vec{x}_m$ by a complex conjugate of the diagonal random phasor matrix to obtain a plurality of range-line samples, $\vec{y}_m$ wherein $\vec{x}_m$ represents a plurality of slow-time samples for each range line m, and $\vec{y}_m$ represents a plurality of range-line samples for each range line.

19. A system according to claim 14, wherein said autofocus processor is capable of reconstructing a true signal based upon a plurality of Doppler frequency steering matrices, $\hat{E}_m$, wherein the plurality of Doppler frequency steering matrices are represented as follows:

$$\hat{E}_m = E(\hat{f}_{1,m}, \ldots, \hat{f}_{K,m}),$$

and wherein $\hat{f}$ represents the Doppler frequency for each of K point scatterers at each range line m.

20. A system according to claim 19, wherein said autofocus processor is capable of reconstructing a true signal $\hat{s}_m$ for each range line according to the following:

$$\hat{s}_m = \hat{E}_m \hat{a}_m,$$

and wherein $\hat{a}_m$ represents a plurality of complex amplitudes of the scatterers at each range line.

21. A system according to claim 20, wherein said autofocus processor is capable of reconstructing a true signal by further determining the plurality of complex amplitudes of the scatterers at each range line according to the following:

$$\hat{a}_m = (\hat{E}_m^* \hat{E}_m)^{-1} \hat{E}_m^* \vec{y}_m,$$

and wherein $\vec{y}_m$ represents a plurality of range-line samples for each range line.

22. A system according to claim 20, wherein said autofocus processor is capable of obtaining a correction $\delta\hat{\phi}_n$ to the estimated phase error for each slow-time sample according to the following:

$$\delta\hat{\phi}_n = \arg\left\{\sum_m y_{n,m} \bar{\hat{s}}_{n,m}\right\},$$

and wherein n=-N, ..., 0, ... N represents each of 2N+1 slow-time samples at each range line.

23. A system for determining an accuracy of estimated phase errors in synthetic aperture radar signals, wherein the signals are from a plurality of range lines that each includes a plurality of azimuth positions, said system comprising:

a processing element capable of calculating true signals for a plurality of slow-time samples for the plurality of range lines, wherein the plurality of slow-time samples represent radar signals for a plurality of azimuth positions for a plurality of range lines, wherein said processing element is also capable of determining a true signal power for each slow-time sample summed over the plurality of range lines and a total true signal power, wherein the true signal powers are based upon the true signals and the total true signal power is based upon amplitudes of the scatterers, said processing element additionally being capable of determining a Cramer Rao Bound (CRB) based upon a clutter-plus-receiver noise power, the true signal powers, a dominant scatterer power, the number of slow time samples and the total true signal power, and wherein said processing element is further capable of determining a root mean square error based upon the CRB.

24. A system according to claim 23, wherein said processing element is also capable of estimating the clutter-plus-receiver noise power based upon a uniform clutter noise and a receiver noise model.

25. A system according to claim 23, wherein said processing element is also capable of selecting a plurality of signal scatterer, and wherein the true signals are calculated based upon the point scatterer parameters.

26. A system according to claim 23, wherein said processing element is capable of calculating the, true signals by:

receiving the plurality of slow-time samples and thereafter estimating a phase error for each slow-time sample;

compensating the plurality of slow-time samples by the estimated phase errors to obtain a plurality of range-line samples;

processing the range-line samples according to a super-resolution signal processing technique to thereby obtain a plurality of Doppler frequencies for a plurality of point scatterers at each range line; and reconstructing a true signal for each range line based upon the plurality of Doppler frequencies.

27. A computer program product for reducing errors in synthetic aperture radar signals from a plurality of range lines where each range line includes a plurality of azimuth positions, said computer program product comprising a computer-readable storage medium having computer-readable program code portions stored therein, the computer-readable program portions comprising:

a first executable portion for receiving a plurality of slow-time samples representing radar signals for a plurality of azimuth positions for a plurality of range lines;

a second executable portion for estimating a phase error for each slow-time sample;

a third executable portion for compensating the plurality of slow-time samples by the estimated phase errors to obtain a plurality of range-line samples;

a fourth executable portion for processing the range-line samples according to a superresolution signal processing technique to thereby obtain a plurality of Doppler frequencies for a plurality of point scattersers at each range line;

a fifth executable portion for reconstructing a true signal for each range line based upon the plurality of Doppler frequencies; and a sixth executable portion for obtaining a correction to the estimated phase error for each slow-time sample based upon the range-line samples and the true signals.

28. A computer program product according to claim 27 further comprising a seventh executable portion for replacing the slow-time samples with the range-line samples when a root mean square error (RMSE) of the estimated phase error correction for each slow-time sample is greater than a predetermined threshold, wherein said third executable portion compensates the slow-time samples, said fourth executable portion processes the range-line samples, said fifth executable portion reconstructs the true signal, said sixth executable portion obtains the correction, and said seventh executable portion replaces the slow-time samples until the RMSE of the correction for each slow-time sample is less than the predetermined threshold.

29. A computer program product according to claim 27, wherein said fourth executable portion processes the range-line samples according to a superresolution signal processing technique including Constrained Total Least Squares parameter estimation.

30. A computer program product according to claim 27, wherein said third executable portion compensates the plurality of slow-time samples based upon a diagonal random phasor matrix.

31. A computer program product according to claim 30, wherein said third executable portion compensates the plurality of slow-time samples by multiplying the slow-time samples $\vec{x}_m$ by a complex conjugate of the diagonal random phasor matrix to obtain a plurality of range-line samples, $\vec{y}_m$, wherein $\vec{x}_m$ represents a plurality of slow-time samples for each range line m, and $\vec{y}_m$ represents a plurality of range-line samples for each range line.

32. A computer program product according to claim 27, wherein said fifth executable portion reconstructs a true signal based upon a plurality of Doppler frequency steering matrices, $\hat{E}_m$, wherein the plurality of Doppler frequency steering matrices are represented as follows:

$$\hat{E}_m = E(\hat{f}_{1,m}, \ldots, \hat{f}_{K,m}),$$

and wherein $\hat{f}_{k,m}$ represents the Doppler frequency for each of K point scatterers at each range line m.

33. A computer program product according to claim 32, wherein said fifth executable portion reconstructs a true signal $\hat{s}_m$ for each range line according to the following:

$$\hat{s}_m = \hat{E}_m \hat{z}_m,$$

and wherein $\hat{z}_m$ represents a plurality of complex amplitudes of the scatterers at each range line.

34. A computer program product according to claim 33, wherein said fifth executable portion reconstructs a true signal by further determining the plurality of complex amplitudes of the scatterers at each range line according to the following:

$$\hat{z}_m = (\hat{E}_m^* \hat{E}_m)^{-1} \hat{E}_m^* \vec{y}_m,$$

and wherein $\vec{y}_m$ represents a plurality of range-line samples for each range line.

35. A computer program product according to claim 33, wherein said sixth executable portion obtains a correction $\delta\hat{\phi}_n$ to the estimated phase error for each slow-time sample according to the following:

$$\delta\hat{\phi}_n = arg\left\{\sum_m y_{n,m} \bar{\hat{s}}_{n,m}\right\},$$

and wherein n=−N, . . . , 0, . . . N represents each of 2N+1 slow-time samples at each range line.

36. A computer program product for determining an accuracy of estimated phase errors in synthetic aperture radar signals, wherein the signals are from a plurality of range lines that each includes a plurality of azimuth positions, said computer program product comprising a computer-readable storage medium having computer-readable program code portions stored therein, the computer-readable program portions comprising:

a first executable portion for calculating true signals for a plurality of slow-time samples for the plurality of range lines, wherein the plurality of slow-time samples represent radar signals for a plurality of azimuth positions for a plurality of range lines;

a second executable portion for determining a true signal power for each slow-time sample summed over the plurality of range lines and a total true signal power, wherein the true signal powers are based upon the true signals and the total true signal power is based upon amplitudes of the scatterers;

a third executable portion for determining a Cramer Rao Bound (CRB) based upon a clutter-plus-receiver noise power, the true signal powers, a dominant scatterer power, the number of slow time samples and the total true signal power; and a fourth executable portion for determining a root mean square error based upon the CRB.

37. A computer program product according to claim 36 further comprising a fifth executable portion for estimating the clutter-plus-receiver noise power based upon a uniform clutter noise and a receiver noise model, wherein said fifth executable portion determines the clutter-plus-receiver noise before said third executable portion determines the CRB.

38. A computer program product according to claim 36 further comprising a fifth executable portion for selecting a plurality of signal scatterer parameters based upon a Fisher information matrix, wherein said fifth executable portion determines the plurality of point scatterer parameters before said first executable portion calculates the true signals, and wherein said first executable portion calculates the true signals is based upon the point scatterer parameters.

39. A computer program product according to claim 36, wherein said first executable portion calculates the true signals by:

receiving the plurality of slow-time samples and thereafter estimating a phase error for each slow-time sample;

compensating the plurality of slow-time samples by the estimated phase errors to obtain a plurality of range-line samples;

processing the range-line samples according to a super-resolution signal processing technique to thereby obtain a plurality of Doppler frequencies for a plurality of point scatterers at each range line; and reconstructing a true signal for each range line based upon the plurality of Doppler frequencies.

* * * * *

UNITED STATES PATENT AND TRADEMARK OFFICE
CERTIFICATE OF CORRECTION

PATENT NO. : 6,603,424 B1
DATED : August 5, 2003
INVENTOR(S) : Abatzoglou

It is certified that error appears in the above-identified patent and that said Letters Patent is hereby corrected as shown below:

Column 3,
Line 57, the equation should appear as follows: $\hat{\bar{z}}_m = (\hat{E}_m{}^*\hat{E}_m)^{-1}\hat{E}_m{}^*\bar{y}_m$ Column 7,
Lines 52-54, equation (3) should appear as follows: $\underset{\{f_{k,m}\}_{k,m} \atop \{\phi_n\}_n}{Max}\left\{\sum_m \bar{x}_m^* DE_m\left(E_m^* E_m\right)^{-1} E_m^* D^* \bar{x}_m\right\}$ Column 19,
Line 26, the equation should appear as follows: $\hat{\bar{z}}_m = (\hat{E}_m{}^*\hat{E}_m)^{-1}\hat{E}_m{}^*\bar{y}_m$, Column 21,
Line 67, after "the" cancel the comma ",".

Column 22,
Line 33, "scattersers" should read -- scatterers --.

Column 23,
Lines 25 and 26, the equation should appear as follows:

$$\hat{\bar{z}}_m = (\hat{E}_m{}^*\hat{E}_m)^{-1}\hat{E}_m{}^*\bar{y}_m,$$

Signed and Sealed this

Twenty-third Day of December, 2003

JAMES E. ROGAN
*Director of the United States Patent and Trademark Office*